United States Patent
Hashimoto et al.

(10) Patent No.: US 10,315,467 B2
(45) Date of Patent: Jun. 11, 2019

(54) PNEUMATIC TIRE

(71) Applicant: SUMITOMO RUBBER INDUSTRIES, LTD., Kobe-shi, Hyogo (JP)

(72) Inventors: Keisuke Hashimoto, Kobe (JP); Eisuke Hirosue, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 86 days.

(21) Appl. No.: 15/201,760

(22) Filed: Jul. 5, 2016

(65) Prior Publication Data
US 2017/0057301 A1    Mar. 2, 2017

(30) Foreign Application Priority Data

Aug. 31, 2015  (JP) .................................. 2015-170353

(51) Int. Cl.
 *B60C 17/00* (2006.01)
 *B60C 15/06* (2006.01)
 *B60C 15/00* (2006.01)

(52) U.S. Cl.
 CPC ...... *B60C 17/0009* (2013.01); *B60C 15/0045* (2013.01); *B60C 15/0603* (2013.01); *B60C 15/0607* (2013.01); *B60C 2015/061* (2013.01); *B60C 2015/0614* (2013.01); *B60C 2015/0617* (2013.01); *B60C 2015/0621* (2013.01); *B60C 2015/0639* (2013.01);

(Continued)

(58) Field of Classification Search
 CPC ............ B60C 15/0603; B60C 15/0607; B60C 2001/0058; B60C 2005/145; B60C 2005/147; B60C 2015/0696
 See application file for complete search history.

(56) References Cited

U.S. PATENT DOCUMENTS

| 4,067,374 A | * | 1/1978 | Alden | ....................... B60C 9/20 |
| | | | | 152/379.3 |
| 2003/0116250 A1 | * | 6/2003 | Minami | .................. B60C 15/06 |
| | | | | 152/458 |

(Continued)

FOREIGN PATENT DOCUMENTS

| EP | 1023191 B1 | * | 6/2002 | ............... B60C 9/08 |
| JP | 11-301218 A | | 11/1999 | |

(Continued)

*Primary Examiner* — Robert C Dye
*Assistant Examiner* — Nicholas R Krasnow
(74) *Attorney, Agent, or Firm* — Birch, Stewart, Kolasch & Birch LLP

(57) ABSTRACT

In an apex 34 of a tire 2, a reinforcing portion 48 is located inward of a main body 46 in an axial direction. When a position on an outer surface of the tire 2 at which position a height from a BBL is 14 mm is defined as a first point P1 and a position on the outer surface of the tire 2 at which position a height from the BBL is 20 mm is defined as a second point P2, the reinforcing portion 48 overlaps the first point P1 and the second point P2 in a radial direction. A loss tangent of the reinforcing portion 48 is equal to a loss tangent of the main body 46 or less than the loss tangent. A hardness of the reinforcing portion 48 is equal to a hardness of the main body 46 or greater than the hardness.

11 Claims, 4 Drawing Sheets

(52) U.S. Cl.
CPC ............... *B60C 2015/0642* (2013.01); *B60C 2015/0682* (2013.01); *B60C 2017/0063* (2013.01)

(56) References Cited

U.S. PATENT DOCUMENTS

| | | | |
|---|---|---|---|
| 2005/0045260 A1* | 3/2005 | Maruoka | B60C 15/0027 152/541 |
| 2009/0294007 A1* | 12/2009 | Vorreiter | B60C 17/0009 152/524 |
| 2010/0147439 A1 | 6/2010 | Koeune et al. | |
| 2015/0202929 A1 | 7/2015 | Horiuchi | |

FOREIGN PATENT DOCUMENTS

| | | | |
|---|---|---|---|
| JP | 2003-291613 A | 10/2003 |
| JP | 2010-137853 A | 6/2010 |
| JP | 2011-255858 A | 12/2011 |

\* cited by examiner

PNEUMATIC TIRE

This application claims priority on Patent Application No. 2015-170353 filed in JAPAN on Aug. 31, 2015. The entire contents of this Japanese Patent Application are hereby incorporated by reference.

BACKGROUND OF THE INVENTION

Field of the Invention

The present invention relates to pneumatic tires.

Description of the Related Art

In recent years, run flat tires including load support layers inside sidewalls have been developed and widespread. A highly hard crosslinked rubber is used for the support layers. Such run flat tires are called a side reinforcing type. In this type of a run flat tire, if the internal pressure is reduced due to puncture, the support layers can support the vehicle weight. Run flat tires allow for running for some distance even in a punctured state. Regarding run flat tires, various examinations have been made. An example of the examinations is disclosed in JP2010-137853 (US2010/0147439).

The tire disclosed in the above publication includes a carcass, first and second inserts, and an inner liner. The carcass includes a first reinforcing ply. The first and second inserts are located between the inner liner and the first reinforcing ply. In this tire, tension is easily applied to the first reinforcing ply. Since the reinforcing ply supports a load, a tensile load applied to the first and second inserts is minimized. Accordingly, a "soft" run on flat design is achieved in this tire.

When a tire becomes punctured so that the internal pressure thereof decreases, the tire itself supports the vehicle weight. Since a great load is applied to the tire, deformation of the tire is large. The deformation generates heat. Thus, when running in a state where a tire is punctured so that the internal pressure thereof decreases (hereinafter, referred to as run-flat running) is performed, the tire becomes very hot. The heat of the tire accelerates deterioration of the components of the tire, and thus there is a possibility that the components are damaged.

In a run flat tire, load support layers are provided to support the vehicle weight when the internal pressure of the tire decreases due to puncture. In view of the reason for adopting the support layers, it is ideal for the run-flat running if damage occurs from the support layer. However, in the run flat tire, damage may occur in a bead portion, not in a support layer portion. In this case, the damage tends to occur at a relatively early stage, and there is a possibility that the vehicle cannot run sufficiently in a punctured state.

Each bead of a tire includes a core and an apex. The core has a ring shape. The apex extends from the core outward in a radial direction. The apex is tapered outward in the radial direction. The apex is formed from a highly hard crosslinked rubber.

If deformation of a tire is suppressed, heat generation is also suppressed. A low degree of heat generation contributes to improvement in durability. In this respect, adopting a large apex may be considered in order to suppress deformation of a bead portion to ensure desired durability of this portion.

In manufacture of a tire, a combination of a core and an apex may be prepared as an intermediate component. However, the width of the apex is limited by the width of the core, so that a large apex cannot be adopted in some cases.

An apex may be prepared as an intermediate component. Normally, the apex is processed such that a cross-section thereof is triangular. The apex that has not been vulcanized is flexible. If the apex is kept in a state where the apex is wound on a drum or the like, the apex may become deformed. The deformed apex may influence the performance of a tire.

An apex may be formed by using a band-like strip. In this case, the strip is wound many times and the shape of an apex is adjusted, so that it is not easy to make only a specific portion thick.

On an apex composed of a single member, there are many structural limitations, so that it is difficult to ensure desired stiffness of a bead portion to suppress deformation of this portion.

An object of the present invention is to provide a pneumatic tire that achieves improvement in durability in a state where the internal pressure of the pneumatic tire is decreased due to puncture.

SUMMARY OF THE INVENTION

A pneumatic tire according to the present invention includes a tread, a pair of sidewalls, a pair of clinches, a pair of beads, and a pair of load support layers. Each sidewall extends from an edge of the tread substantially inward in a radial direction. Each clinch extends from an edge of the sidewall substantially, inward in the radial direction. Each bead is located inward of the clinch in an axial direction. Each load support layer is located inward of the sidewall in the axial direction. The bead includes a core and an apex. The apex is located outward of the core in the radial direction. The apex includes a main body and a reinforcing portion. The main body extends from the core substantially outward in the radial direction. The reinforcing portion is located inward or outward of the main body in the axial direction and extends along the main body. When a position on an outer surface of the tire at which position a height in the radial direction from an bead base line is 14 mm is defined as a first point P1, and a position on the outer surface of the tire at which position a height in the radial direction from the bead base line is 20 mm is defined as a second point P2, the reinforcing portion overlaps each of the first point P1 and the second point P2 in the radial direction. A loss tangent of the reinforcing portion is equal to a loss tangent of the main body or less than the loss tangent, and is equal to a loss tangent of the load support layer or less than the loss tangent. A hardness of the reinforcing portion is equal to a hardness of the main body or greater than the hardness, and is equal to a hardness of the load support layer or greater than the hardness. When the loss tangent of the reinforcing portion is equal to the loss tangent of the main body, the hardness of the reinforcing portion is greater than the hardness of the main body. When the hardness of the reinforcing portion is equal to the hardness of the main body, the loss tangent of the reinforcing portion is less than the loss tangent of the main body.

Preferably, in the pneumatic tire, when a line that is normal to the outer surface of the tire at the second point P2 is defined as a reference normal line, a thickness of the apex measured along the reference normal line is equal to or greater than 5 mm.

Preferably, in the pneumatic tire, a thickness of the reinforcing portion measured along the reference normal line is equal to or greater than 1.5 mm.

Preferably, in the pneumatic tire, a length of the reinforcing portion is equal to or greater than 10 mm and equal to or less than 50 mm.

Preferably, in the pneumatic tire, the apex is composed of the main body and the reinforcing portion. The reinforcing portion is located inward of the main body in the axial direction. The reinforcing portion may be located outward of the main body in the axial direction.

DESCRIPTION OF THE PREFERRED EMBODIMENTS

The following will describe in detail the present invention based on preferred embodiments with appropriate reference to the drawings.

Figure 1:
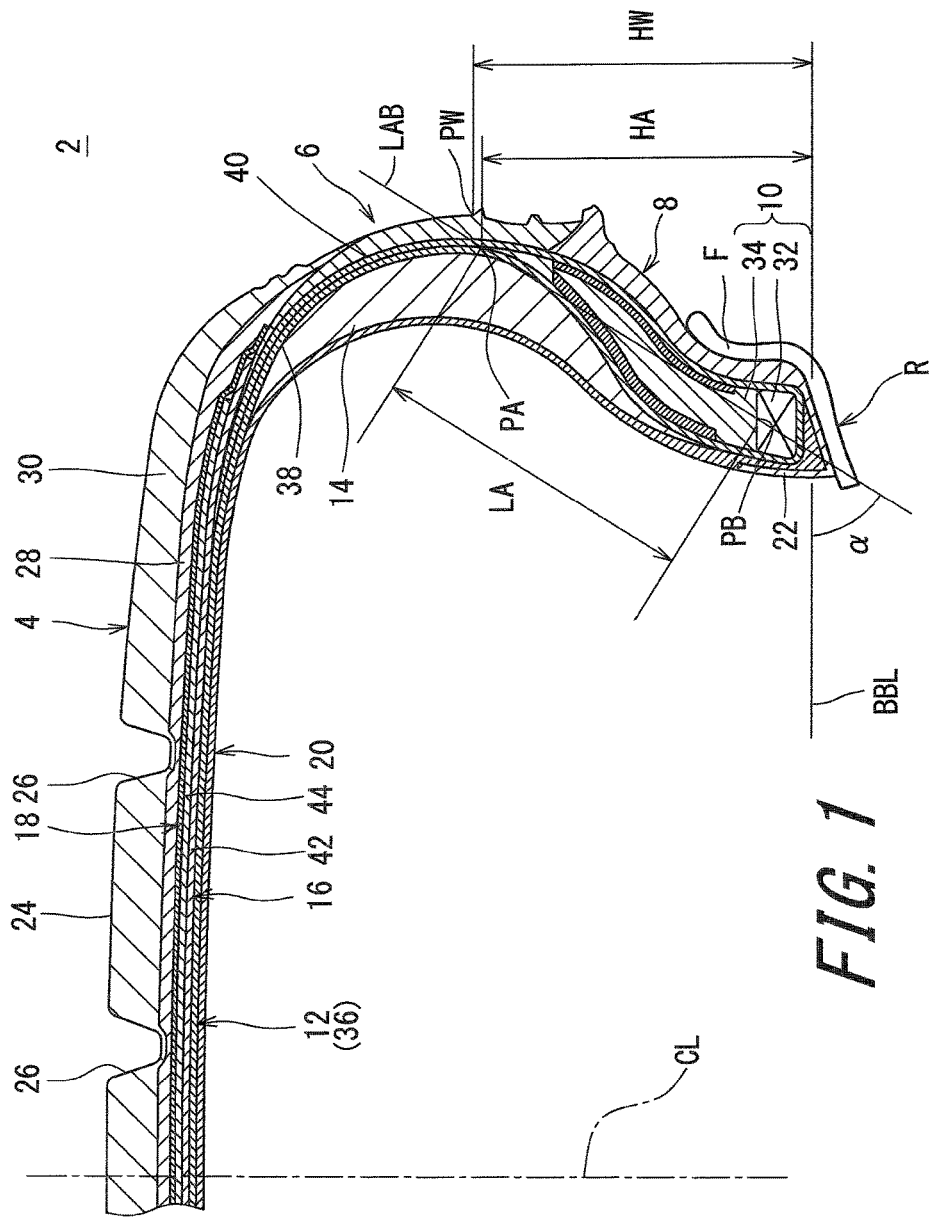
FIG. 1 is a cross-sectional view of a portion of a pneumatic tire according to an embodiment of the present invention.

FIG. 1 shows a pneumatic tire 2. In FIG. 1, the up-down direction is the radial direction of the tire 2, the right-left direction is the axial direction of the tire 2, and the direction perpendicular to the surface of the sheet is the circumferential direction of the tire 2. In FIG. 1, an alternate long and short dash line CL represents the equator plane of the tire 2. The shape of the tire 2 is symmetrical about the equator plane except for a tread pattern.

In FIG. 1, the tire 2 is mounted on a rim R. The rim R is a normal rim. The tire 2 is inflated with air. Accordingly, the internal pressure of the tire 2 is adjusted to a normal internal pressure.

The dimensions and angles of each component of the tire 2 are measured in a state where the tire 2 is mounted on a normal rim and inflated to a normal internal pressure, unless otherwise specified. During the measurement, no load is applied to the tire 2. In the case where the tire 2 is designed for a passenger car, the dimensions and angles are measured in a state where the internal pressure is 180 kPa.

In the present specification, the normal rim means a rim specified in a standard on which the tire 2 is based. The "standard rim" in the JATMA standard, the "Design Rim" in the TRA standard, and the "Measuring Rim" in the ETRTO standard are normal rims.

In the present specification, the normal internal pressure means an internal pressure specified in the standard on which the tire 2 is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures.

In the present specification, a normal load means a load specified in the standard on which the tire 2 is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRO standard are normal loads.

In FIG. 1, a solid line BBL is a bead base line. The bead base line BBL is a line that defines the diameter (see JATMA) of the rim R on which the tire 2 is mounted. The bead base line BBL extends in the axial direction.

In FIG. 1, reference character PW represents a specific position on the outer surface of the tire 2. The tire 2 has a maximum width in the axial direction at the position PW. The position Pw is a position at which the tire 2 has a maximum width. In the case where unevenness such as grooves, dimples, or the like is provided on the outer surface of the tire 2, the position PW is determined on the basis of a virtual outer surface obtained by postulating that the unevenness does not exist, that is, a profile. In the present invention, the outer surface of the tire 2 in a state where the tire 2 is mounted on the rim R and inflated with air to a normal internal pressure and no load is applied to the tire 2 is set as a base for the profile.

The tire 2 includes a tread 4, a pair of sidewalls 6, a pair of clinches 8, a pair of beads 10, a carcass 12, a pair of load support layers 14, a belt 16, a band 18, an inner liner 20, and a pair of chafers 22. The tire 2 is of a tubeless type. The tire 2 is mounted on a passenger car.

The tread 4 has a shape projecting outward in the radial direction. The tread 4 forms a tread surface 24 that is brought into contact with a road surface. Grooves 26 are formed on the tread 4. The tread pattern is formed by the grooves 26. The tread 4 includes a base layer 28 and a cap layer 30. The cap layer 30 is located outward of the base layer 28 in the radial direction. The cap layer 30 is laminated on the base layer 28. The base layer 28 is formed from a crosslinked rubber that is excellent in adhesiveness. A typical base rubber of the base layer 28 is a natural rubber. The cap layer 30 is formed from a crosslinked rubber that is excellent in wear resistance, heat resistance, and grip performance.

Each sidewall 6 extends from the edge of the tread 4 substantially inward in the radial direction. An outer portion, in the radial direction, of the sidewall 6 is joined to the tread 4. An inner portion, in the radial direction, of the sidewall 6 is joined to the clinch 8. The sidewall 6 is formed from a crosslinked rubber that is excellent in cut resistance and weather resistance. The sidewall 6 prevents the carcass 12 from being damaged.

Each clinch 8 extends from the edge of the sidewall 6 substantially inward in the radial direction. The clinch 8 is located outward of the bead 10 and the carcass 12 in the axial direction. The clinch 8 is formed from a crosslinked rubber that is excellent in wear resistance. The clinch 8 comes into contact with a flange F of the rim R.

Each bead 10 is located inward of the clinch 8 in the axial direction. The bead 10 includes a core 32 and an apex 34. The core 32 has a ring shape and includes a non-stretchable wound wire. A typical material of the wire is steel. The apex 34 is located outward of the core 32 in the radial direction. The apex 34 extends from the core 32 substantially outward in the radial direction. The apex 34 is tapered outward in the radial direction.

In FIG. 1, reference character PA indicates the outer edge, in the radial direction, of the apex 34. A double-headed arrow HA indicates the height in the radial direction from the bead base line BBL to the outer edge PA. The height HA is the height of the apex 34 in the radial direction. In FIG. 1, a double-headed arrow HW indicates the height in the radial direction from the bead base line BBL to the position PW. In the present invention, the height HW is referred to as reference height.

In the tire 2, the ratio of the height HA relative to the reference height HW is equal to or greater than 0.8 and equal to or less than 1.2. In other words, in the tire 2, the outer edge PA of the apex 34 is located near the position PW in the radial direction.

In FIG. 1, reference character PB indicates the center, in the axial direction, of the bottom of the apex 34. A solid line LAB is a straight line that passes through the outer edge PA of the apex 34 and the center PB. In the present invention, the straight line LAB is a reference line for the apex 34. An angle α represents the angle formed by the reference line LAB relative to the bead base line BBL.

As is obvious from FIG. 1, in the tire 2, the outer edge PA of the apex 34 is located outward of the center PB of the apex 34 in the axial direction. In other words, the reference line LAB for the apex 34 is tilted relative to the radial direction. Specifically, the reference line LAB is tilted such that the distance in the axial direction from the equator plane to each point on the reference line LAB gradually increases from the inner side toward the outer side in the radial direction. The apex 34 for which the reference line LAB is tilted contributes to supporting the vehicle weight. In this respect, the absolute value of the angle α is preferably equal to or greater than 50° and preferably equal to or less than 70°. In the present invention, in the case where the absolute value of the angle α is equal to or greater than 45°, the apex 34 extends substantially outward in the radial direction.

In FIG. 1, a double-headed arrow LA indicates the length of the apex 34. The length LA is represented by the length from the outer edge PA to the center PB. The length LA is measured along the reference line LAB.

In the tire 2, from the standpoint that the apex 34 contributes to supporting the vehicle weight, the length LA of the apex 34 is preferably equal to or greater than 40 mm and preferably equal to or less than 60 mm.

The carcass 12 includes a ply 36. The carcass 12 of the tire 2 is composed of a single ply 36. The carcass 12 may be composed of two or more plies 36.

The ply 36 extends on and between the beads 10 at both sides. The ply 36 extends along the inner sides of the tread 4, each sidewall 6, and each clinch 8. The ply 36 is turned up around each core 32 from the inner side toward the outer side in the axial direction. Due to this turning-up, a main portion 38 and a pair of turned-up portions 40 are formed in the ply 36. The main portion 38 extends from the equator plane toward each bead 10. Each turned-up portion 40 extends from the bead 10 substantially outward in the radial direction.

In the tire 2, the edge of each turned-up portion 40 reaches the vicinity of the tread 4. Specifically, the edge of each turned-up portion 40 reaches a position directly below the belt 16. In other words, each turned-up portion 40 overlaps the belt 16. The carcass 12 has a so-called "ultra-highly turned-up structure". The carcass 12 having the ultra-highly turned-up structure contributes to durability (run-flat durability) of the tire 2 in a punctured state.

The ply 36 includes a large number of cords aligned with each other, and a topping rubber, which are not shown. The absolute value of the angle of each cord relative to the equator plane is 75° to 90°. In other words, the carcass 12 has a radial structure. The cords are formed from an organic fiber. Examples of preferable organic fibers include polyethylene terephthalate fibers, nylon fibers, rayon fibers, polyethylene naphthalate fibers, and aramid fibers.

Each load support layer 14 is located inward of the sidewall 6 in the axial direction. The support layer 14 is located inward of the carcass 12 in the axial direction. The support layer 14 is interposed between the carcass 12 and the inner liner 20. The support layer 14 is tapered inward in the radial direction and also tapered outward in the radial direction. The support layer 14 has a crescent-like shape. The support layer 14 is formed from a crosslinked rubber. When the tire 2 is punctured, the support layer 14 supports a load. The support layer 14 allows for running for some distance with the tire 2 even in a punctured state. The tire 2 is also referred to as run flat tire. The tire 2 is of a side reinforcing type. The tire 2 may include support layers each having a shape different from the shape of the support layer 14 shown in FIG. 1.

Portions of the carcass 12 which overlap the support layers 14 are separated from the inner liner 20. In other words, the carcass 12 is bent due to the presence of the support layers 14. In a punctured state, a compressive load is applied to the support layers 14, and a tensile load is applied to regions of the carcass 12 which are near the support layers 14. Each support layer 14 is a lump of rubber and thus can sufficiently bear the compressive load. The cords of the carcass 12 can sufficiently bear the tensile load. The support layers 14 and the cords of the carcass 12 suppress vertical flexure of the tire 2 in the punctured state. The tire 2 of which vertical flexure is suppressed is excellent in handling stability in a punctured state.

In light of suppression of vertical flexure in a punctured state, a hardness Hi of each support layer 14 is preferably equal to or greater than 60 and more preferably equal to or greater than 65. In light of ride comfort in a state where the internal pressure is maintained, that is, in a normal state, the hardness Hi is preferably equal to or less than 80 and more preferably equal to or less than 75. Although described later, in the present invention, a hardness measured at 70° C. is represented as "hardness".

In the present invention, the hardness is measured according to the standard of "JIS K6253" with a type A durometer. The hardness is measured by pressing the durometer against the cross section shown in FIG. 1. The measurement is performed at 70° C.

In the tire 2, a loss tangent Ti (tan δ) of each support layer 14 is preferably equal to or less than 0.08. Thus, heat generation in the support layer 14 caused by repeated deformation of the tire 2 is suppressed. The support layer 14 contributes to the durability of the tire 2. In this respect, the loss tangent Ti is more preferably equal to or less than 0.07 and more preferably equal to or less than 0.06. It is more preferable if the loss tangent Ti is smaller. Thus, a preferable lower limit of the loss tangent Ti is not set. Although described later, in the present invention, a loss tangent measured at 70° C. is represented as "loss tangent".

In the present invention, the loss tangent is measured according to the standards of "JIS K 6394" under the following conditions.

Viscoelasticity spectrometer: "VESF-3" manufactured by Iwamoto Seisakusho
Initial strain: 10%
Dynamic strain: ±1%
Frequency: 10 Hz
Deformation mode: tension
Measurement temperature: 70° C.

The belt 16 is located inward of the tread 4 in the radial direction. The belt 16 is laminated on the carcass 12. The belt 16 reinforces the carcass 12. The belt 16 includes an inner layer 42 and an outer layer 44. As is obvious from FIG. 1, the width of the inner layer 42 is slightly greater than the width of the outer layer 44 in the axial direction. Each of the inner layer 42 and the outer layer 44 includes a large number of cords aligned with each other, and a topping rubber, which are not shown. Each cord is tilted relative to the equator plane. The absolute value of the tilt angle is generally equal to or greater than 10° and equal to or less than 35°. The direction in which each cord of the inner layer 42 is tilted relative to the equator plane is opposite to the direction in which each cord of the outer layer 44 is tilted relative to the equator plane. The material of the cords is preferably steel. An organic fiber may be used for the cords. The width, in the axial direction, of the belt 16 is preferably equal to or greater than 0.7 times of the maximum width of the tire 2. The belt 16 may include three or more layers.

The band 18 is located outward of the belt 16 in the radial direction. The width of the band 18 is greater than the width of the belt 16 in the axial direction. The band 18 includes a cord and a topping rubber, which are not shown. The cord is helically wound. The band 18 has a so-called jointless structure. The cord extends substantially in the circumferential direction. The angle of the cord relative to the circumferential direction is equal to or less than 5° and further equal to or less than 2°. The belt 16 is held by the cord, so that lifting of the belt 16 is suppressed. The cord is formed from an organic fiber. Examples of preferable organic fibers include nylon fibers, polyester fibers, rayon fibers, polyethylene naphthalate fibers, and aramid fibers.

The belt 16 and the band 18 form a reinforcing layer. The reinforcing layer may be composed of only the belt 16. The reinforcing layer may be composed of only the band 18.

The inner liner 20 is located inward of the carcass 12. The inner liner 20 forms the inner surface of the tire 2. The inner liner 20 is formed from a crosslinked rubber that is excellent in air blocking property. A typical base rubber of the inner liner 20 is an isobutylene-isoprene-rubber or halogenated isobutylene-isoprene-rubber. The inner liner 20 maintains the internal pressure of the tire 2.

Each chafer 22 is located in the vicinity of the bead 10. When the tire 2 is mounted onto the rim R, the chafer 22 comes into contact with the rim R. Due to this contact, the vicinity of the bead 10 is protected. In this embodiment, each chafer 22 is integrated with the clinch 8. Therefore, the material of the chafer 22 is the same as the material of the clinch 8. The chafer 22 may include a fabric and a rubber with which the fabric is impregnated.

Figure 2:
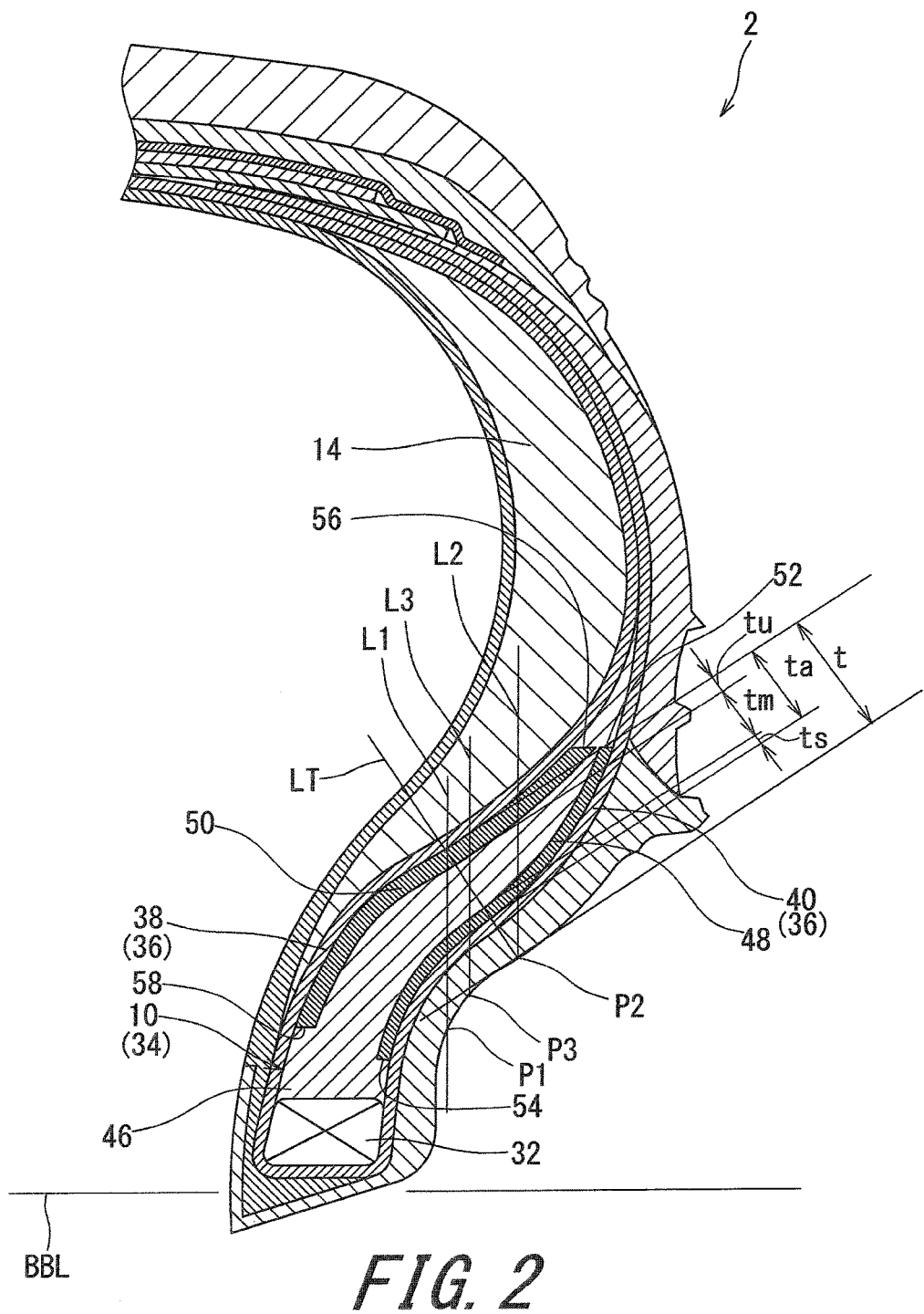
FIG. 2 is an enlarged cross-sectional view of a portion of the tire in FIG. 1.

FIG. 2 shows a bead 10 portion of the tire 2 shown in FIG. 1. In FIG. 2, the up-down direction is the radial direction of the tire 2, the right-left direction is the axial direction of the tire 2, and the direction perpendicular to the surface of the sheet is the circumferential direction of the tire 2.

In the tire 2, each apex 34 includes a main body 46, an outer reinforcing portion 48, and an inner reinforcing portion 50. Specifically, each apex 34 is composed of the main body 46, the outer reinforcing portion 48, and the inner reinforcing portion 50.

The main body 46 is located outward of the core 32 in the radial direction. The main body 46 extends from the core 32 substantially outward in the radial direction. The main body 46 is interposed between the outer reinforcing portion 48 and the inner reinforcing portion 50. The main body 46 is formed from a crosslinked rubber.

In the tire 2, in light of suppression of vertical flexure in a punctured state, a hardness Hm of the main body 46 is preferably equal to or greater than 60 and more preferably equal to or greater than 65. In light of ride comfort in a normal state, the hardness Hm is preferably equal to or less than 80 and more preferably equal to or less than 75. The hardness Hm of the main body 46 is measured in the same manner as for the hardness Hi of the support layer 14 described above.

In the tire 2, a loss tangent Tm of the main body 46 is preferably equal to or less than 0.08. Thus, heat generation in the main body 46 caused by repeated deformation of the tire 2 is suppressed. The main body 46 contributes to the durability of the tire 2. In this respect, the loss tangent Tm is more preferably equal to or less than 0.07 and more preferably equal to or less than 0.06. It is more preferable if the loss tangent Tm is smaller. Thus, a preferable lower limit of the loss tangent Tm is not set. The loss tangent Tm of the main body 46 is measured in the same manner as for the loss tangent Ti of the support layer 14 described above.

In the tire 2, the outer reinforcing portion 48 is located outward of the main body 46 in the axial direction. The outer reinforcing portion 48 extends along the main body 46. As is obvious from FIG. 2, the outer reinforcing portion 48 is interposed between the main body 46 and the turned-up portion 40. The outer reinforcing portion 48 is formed from a crosslinked rubber.

In the tire 2, a crosslinked rubber having a hardness Hs and a loss tangent Ts that are adjusted with respect to the hardness Hm and the loss tangent Tm of the main body 46 and the hardness Hi and the loss tangent Ti of the load support layer 14 as described below is adopted for the outer reinforcing portion 48. The hardness Hs is measured in the same manner as for the hardness Hi of the support layer 14 described above. The loss tangent Ts is measured in the same manner as for the loss tangent Ti of the support layer 14 described above.

In the tire 2, the hardness Hs of the outer reinforcing portion 48 is equal to the hardness Hm of the main body 46 or greater than the hardness Hm of the main body 46. The loss tangent Ts of the outer reinforcing portion 48 is equal to the loss tangent Tm of the main body 46 or less than the loss tangent Tm of the main body 46. In the case where the hardness Hs of the outer reinforcing portion 48 is equal to the hardness Hm of the main body 46, the loss tangent Ts of the outer reinforcing portion 48 is less than the loss tangent Tm of the main body 46. In the case where the loss tangent Ts of the outer reinforcing portion 48 is equal to the loss tangent Tm of the main body 46, the hardness Hs of the outer reinforcing portion 48 is greater than the hardness Hm of the main body 46.

Furthermore, in the tire 2, the hardness Hs of the outer reinforcing portion 48 is equal to the hardness Hi of the load support layer 14 or greater than the hardness Hi of the load support layer 14. The loss tangent Ts of the outer reinforcing portion 48 is equal to the loss tangent Ti of the support layer 14 or less than the loss tangent Ti of the support layer 14.

In the tire 2, the inner reinforcing portion 50 is located inward of the main body 46 in the axial direction. The inner reinforcing portion 50 extends along the main body 46. As is obvious from FIG. 2, the inner reinforcing portion 50 is interposed between the main body 46 and the main portion 38. The inner reinforcing portion 50 is formed from a crosslinked rubber. In the tire 2, the inner reinforcing portion 50 is formed from a material that is the same as the material of the outer reinforcing portion 48 described above. The inner reinforcing portion 50 may be formed from a material that is different from the material of the outer reinforcing portion 48. Forming the tire 2 with fewer components contributes to the productivity of the tire 2. In this respect, the inner reinforcing portion 50 and the outer reinforcing portion 48 are preferably formed from the same material.

In the tire 2, a crosslinked rubber having a hardness Hu and a loss tangent Tu that are adjusted with respect to the hardness Hm and the loss tangent Tm of the main body 46 and the hardness Hi and the loss tangent Ti of the load support layer 14 as described below is adopted for the inner reinforcing portion 50. The hardness Hu is measured in the same manner as for the hardness Hi of the support layer 14 described above. The loss tangent Tu is measured in the same manner as for the loss tangent Ti of the support layer 14 described above.

In the tire 2, the hardness Hu of the inner reinforcing portion 50 is equal to the hardness Hm of the main body 46 or greater than the hardness Hm of the main body 46. The loss tangent Tu of the inner reinforcing portion 50 is equal to the loss tangent Tm of the main body 46 or less than the loss tangent Tm of the main body 46. In the case where the hardness Hu of the inner reinforcing portion 50 is equal to the hardness Hm of the main body 46, the loss tangent Tu of the inner reinforcing portion 50 is less than the loss tangent Tm of the main body 46. In the case where the loss tangent Tu of the inner reinforcing portion 50 is equal to the loss tangent Tm of the main body 46, the hardness Hu of the inner reinforcing portion 50 is greater than the hardness Hm of the main body 46.

Furthermore, in the tire 2, the hardness Hu of the inner reinforcing portion 50 is equal to the hardness Hi of the load support layer 14 or greater than the hardness Hi of the load support layer 14. The loss tangent Tu of the inner reinforcing portion 50 is equal to the loss tangent Ti of the support layer 14 or less than the loss tangent Ti of the support layer 14.

In FIG. 2, reference character P1 represents a specific position on the outer surface of the tire 2. In the tire 2, the height in the radial direction from the bead base line BBL to the position P1 is 14 mm. The position P1 is a position on the outer surface of the tire 2 at which the height in the radial direction from the bead base line BBL is 14 mm. In the present invention, the position P1 is referred to as first point. Similarly to the position P1, reference character P2 represents a specific position on the outer surface of the tire 2. In the tire 2, the height in the radial direction from the bead base line BBL to the position P2 is 20 mm. The position P2 is a position on the outer surface of the tire 2 at which the height in the radial direction from the bead base line BBL is 20 mm. In the present invention, the position P2 is referred to as second point. Similarly to the position P1 and the position P2, reference character P3 represents a specific position on the outer surface of the tire 2. In the tire 2, the height in the radial direction form the bead base line BBL to the position P3 is 17 mm. The position P3 is a position on the outer surface of the tire 2 at which the height in the radial direction from the bead base line BBL is 17 mm. In the present invention, the position P3 is referred to as third point.

In the present invention, the first point P1, the second point P2, and the third point P3 are determined on the basis of the profile for which the base is the outer surface of the tire 2 in a state where the tire 2 is mounted on the rim R and inflated with air to a normal internal pressure and no load is applied to the tire 2.

In FIG. 2, a solid line L1 is a straight line that passes through the first point P1 and extends in the radial direction. A solid line L2 is a straight line that passes through the second point P2 and extends in the radial direction. A solid line L3 is a straight line that passes through the third point P3 and extends in the radial direction.

In the tire 2, the outer reinforcing portion 48 overlaps each of the first point P1 and the second point P2 in the radial direction. The outer reinforcing portion 48 further overlaps the third point P3 in the radial direction. In other words, the outer reinforcing portion 48 overlaps a zone from the first point P1 to the second point P2 in the radial direction. The outer reinforcing portion 48 is included in a region from the straight line L1 to the straight line L2.

In the tire 2, the inner reinforcing portion 50 overlaps each of the first point P1 and the second point P2 in the radial direction. The inner reinforcing portion 50 further overlaps the third point P3 in the radial direction. In other words, the inner reinforcing portion 50 overlaps the zone from the first point P1 to the second point P2 in the radial direction. The inner reinforcing portion 50 is included in the region from the straight line L1 to the straight line L2.

The tire 2 is fitted onto the rim R and used. In this used state, the bead 10 portion of the tire 2 is in contact with the rim R. Thus, a contact surface is formed between the tire 2 and the rim R.

In the tire 2, the zone from the first point P1 to the second point P2 corresponds to an outer portion, in the radial direction, of the contact surface. At the inner side in the radial direction with respect to this portion, the tire 2 is firmly fixed to the rim R. At the outer side in the radial direction with respect to this portion, the tire 2 is released from the rim R. Thus, near this portion, distortion is easily concentrated. When the tire 2 becomes punctured so that the internal pressure thereof decreases, the tire 2 itself supports the vehicle weight. At this time, a great load is applied to the tire 2. Thus, when running is performed in a state where the tire 2 is punctured so that the internal pressure thereof decreases, that is, during run-flat running, a great load is applied to the bead 10 portion of the tire 2, so that distortion tends to be concentrated particularly on the bead 10 portion.

In the tire 2, the outer reinforcing portion 48 is located outward of the main body 46 in the axial direction and extends along the main body 46. In the tire 2, the outer reinforcing portion 48 contributes to ensuring a desired thickness of the apex 34. In the tire 2, the inner reinforcing portion 50 is located inward of the main body 46 in the axial direction and extends along the main body 46. In the tire 2, similarly to the outer reinforcing portion 48, the inner reinforcing portion 50 also contributes to ensuring a desired thickness of the apex 34.

In the tire 2, the loss tangent Ts of the outer reinforcing portion 48 is equal to the loss tangent Tm of the main body 46 or less than the loss tangent Tm, and is equal to the loss tangent Ti of the load support layer 14 or less than the loss tangent Ti. The hardness Hs of the outer reinforcing portion 48 is equal to the hardness Hm of the main body 46 or greater than the hardness Hm, and is equal to the hardness Hi of the load support layer 14 or greater than the hardness Hi. That is, the hardness Hs and the loss tangent Ts of the outer reinforcing portion 48 are adjusted in a well-balanced manner with respect to those of the main body 46 and the load support layer 14. In the tire 2, the loss tangent Tu of the inner reinforcing portion 50 is equal to the loss tangent Tm of the main body 46 or less than the loss tangent Tm, and is equal to the loss tangent Ti of the load support layer 14 or less than the loss tangent Ti. The hardness Hu of the inner reinforcing portion 50 is equal to the hardness Hm of the main body 46 or greater than the hardness Hm, and is equal to the hardness Hi of the load support layer 14 or greater than the hardness Hi. That is, similarly to the hardness Hs and the loss tangent Ts of the outer reinforcing portion 48, the hardness Hu and the loss tangent Tu of the inner reinforcing portion 50 are also adjusted in a well-balanced manner with respect to those of the main body 46 and the load support layer 14.

Moreover, in the tire 2, the outer reinforcing portion 48 is disposed so as to cover a portion where the tire 2 and the rim R are in contact with each other in a state where the tire 2 is fitted on the rim R. Similarly to the outer reinforcing portion 48, the inner reinforcing portion 50 is also disposed so as to cover the portion where the tire 2 and the rim R are in contact with each other in a state where the tire 2 is fitted on the rim R.

In the tire 2, deformation of the bead 10 portion is effectively suppressed, and heat generation in this portion is also effectively suppressed. In the tire 2, damage of the bead 10 portion is prevented. With the tire 2, a sufficient running distance is ensured even in a state where the internal pressure thereof is decreased due to puncture.

According to the present invention, the pneumatic tire 2 is obtained which achieves improvement in durability in a state where the internal pressure thereof is decreased due to puncture.

In the tire 2, the difference between the hardness Hs of the outer reinforcing portion 48 and the hardness Hm of the main body 46 is preferably equal to or greater than 5. Thus, the outer reinforcing portion 48 effectively suppresses deformation of the bead 10 portion. The suppression of deformation contributes to suppression of heat generation. The tire 2 is excellent in durability during run-flat running. In the tire 2, this difference is preferably equal to or less than 20. Thus, influence of the outer reinforcing portion 48 on stiffness is suppressed. With the tire 2, during normal running, favorable ride comfort is maintained.

In the tire 2, the difference between the loss tangent Ts of the outer reinforcing portion 48 and the loss tangent Tm of the main body 46 is preferably equal to or less than −0.03. Thus, heat generation in the outer reinforcing portion 48 caused by deformation is effectively suppressed. The tire 2 is excellent in durability during run-flat running. It is more preferable if the loss tangent Ts is smaller with respect to the loss tangent Tm of the main body 46. Thus, a lower limit of this difference is not set.

In the tire 2, the difference between the hardness Hs of the outer reinforcing portion 48 and the hardness Hi of the load support layer 14 is preferably equal to or greater than 5. Thus, during run-flat running, deformation of the bead 10 portion is suppressed, and deformation of the support layer 14 is promoted. The tire 2 is excellent in durability during run-flat running. In the tire 2, this difference is preferably equal to or less than 20. Thus, the influence of the outer reinforcing portion 48 on stiffness is suppressed. With the tire 2, during normal running, favorable ride comfort is maintained.

In the tire 2, the difference between the loss tangent Ts of the outer reinforcing portion 48 and the loss tangent Ti of the load support layer 14 is preferably equal to or less than −0.03. Thus, heat generation in the outer reinforcing portion 48 caused by deformation is effectively suppressed. The tire 2 is excellent in durability during run-flat running. It is more preferable if the loss tangent Ts is smaller with respect to the loss tangent Ti of the load support layer 14. Thus, a lower limit of this difference is not set.

In the tire 2, the difference between the hardness Hu of the inner reinforcing portion 50 and the hardness Hm of the main body 46 is preferably equal to or greater than 5. Thus, the inner reinforcing portion 50 effectively suppresses deformation of the bead 10 portion. The suppression of deformation contributes to suppression of heat generation. The tire 2 is excellent in durability during run-flat running. In the tire 2, this difference is preferably equal to or less than 20. Thus, influence of the inner reinforcing portion 50 on stiffness is suppressed. With the tire 2, during normal running, favorable ride comfort is maintained.

In the tire 2, the difference between the loss tangent Tu of the inner reinforcing portion 50 and the loss tangent Tm of the main body 46 is preferably equal to or less than −0.03. Thus, heat generation in the inner reinforcing portion 50 caused by deformation is effectively suppressed. The tire 2 is excellent in durability during run-flat running. It is more preferable if the loss tangent Tu is smaller with respect to the loss tangent Tm of the main body 46. Thus, a lower limit of this difference is not set.

In the tire 2, the difference between the hardness Hu of the inner reinforcing portion 50 and the hardness Hi of the load support layer 14 is preferably equal to or greater than 5. Thus, during run-flat running, deformation of the bead 10 portion is suppressed, and deformation of the support layer 14 is promoted. The tire 2 is excellent in durability during run-flat running. In the tire 2, this difference is preferably equal to or less than 20. Thus, the influence of the inner reinforcing portion 50 on stiffness is suppressed. With the tire 2, during normal running, favorable ride comfort is maintained.

In the tire 2, the difference between the loss tangent Tu of the inner reinforcing portion 50 and the loss tangent Ti of the load support layer 14 is preferably equal to or less than −0.03. Thus, heat generation in the inner reinforcing portion 50 caused by deformation is effectively suppressed. The tire 2 is excellent in durability during run-flat running. It is more preferable if the loss tangent Tu is smaller with respect to the loss tangent Ti of the load support layer 14. Thus, a lower limit of this difference is not set.

In FIG. 2, a solid line Lt is a line that is normal to the outer surface of the tire 2. The normal line LT passes through the second point P2. In the present invention, the normal line LT of the outer surface of the tire 2 at the second point P2 is referred to as reference normal line.

In FIG. 2, a double-headed arrow t represents the length from the outer surface of the tire 2 to the main portion 38. The length t is the thickness of an outer portion of the main portion 38 of the tire 2 at the second point P2. A double-headed arrow ta represents the thickness of the apex 34 at the second point P2. A double-headed arrow tm represents the thickness of the main body 46 at the second point P2. A double-headed arrow ts represents the thickness of the outer reinforcing portion 48 at the second point P2. A double-headed arrow tu represents the thickness of the inner reinforcing portion 50 at the second point P2. The thickness t, the thickness ta, the thickness tm, the thickness ts, and the thickness tu are measured along the reference normal line LT.

In the tire 2, the thickness ta of the apex 34 is preferably equal to or greater than 5 mm. Thus, a sufficient thickness t is ensured at the outer portion of the main portion 38. In the tire 2, deformation of the bead 10 portion is suppressed. The tire 2 is excellent in durability during run-flat running. In light of ride comfort during normal running, the thickness ta is preferably equal to or less than 15 mm. In the present invention, the thickness ta is equal to the sum (ts+tm+tu) of the thickness ts, the thickness tm, and the thickness tu.

In the tire 2, the sum (ts+tu) of the thickness ts of the outer reinforcing portion 48 and the thickness tu of the inner reinforcing portion 50 is preferably equal to or greater than 1.5 mm. Thus, a sufficient thickness t is ensured at the outer portion of the main portion 38. In the tire 2, deformation of the bead 10 portion is suppressed. In addition, in the tire 2 in which the sum (ts+tu) is set to 1.5 mm or greater, heat generation in the apex 34 itself occurring with deformation is also effectively suppressed. The tire 2 is excellent in durability during run-flat running. The proportion of the thickness ts (or the thickness tu) to the sum (ts+tu) is not particularly limited. The proportion of the thickness ts (or the thickness tu) to the sum (ts+tu) is determined as appropriate in accordance with the specifications of the tire 2.

In the tire 2, the sum (ts+tu) of the thickness ts of the outer reinforcing portion 48 and the thickness tu of the inner reinforcing portion 50 is preferably equal to or less than 11.5 mm. Thus, during normal running, favorable ride comfort is maintained.

In the tire 2, the proportion of the sum (ts+tu) to the thickness ta influences ride comfort during normal running. From the standpoint that favorable ride comfort is maintained, the ratio of the sum (ts+tu) relative to the thickness ta is preferably equal to or less than 0.8. In light of run-flat durability, this ratio is preferably equal to or greater than 0.2.

As described above, the thickness ta is equal to the sum (ts+tm+tu) of the thickness ts, the thickness tm, and the thickness tu. Therefore, the ratio of the sum (ts+tu) relative to the thickness ta being equal to or less than 0.8 is synonymous with the ratio of the thickness tm relative to the thickness ta being equal to or greater than 0.2. The ratio of the sum (ts+tu) relative to the thickness ta being equal to or greater than 0.2 is synonymous with the ratio of the thickness tm relative to the thickness ta being equal to or less than 0.8.

In the tire 2, a length Ls of the outer reinforcing portion 48 is preferably equal to or greater than 10 mm and preferably equal to or less than 50 mm. By the length Ls being set to 10 mm or greater, the outer reinforcing portion 48 effectively contributes to run-flat durability. In this respect, the length Ls is more preferably equal to or greater than 15 mm. By the length Ls being set to 50 mm or less, the influence of the outer reinforcing portion 48 on stiffness is suppressed. With the tire 2, favorable ride comfort is maintained. In this respect, the length Ls is more preferably equal to or less than 45 mm. In the cross-section of the tire 2 shown in FIG. 1 or 2, the length Ls is obtained by measuring the length from an outer edge 52, in the radial direction, of the outer reinforcing portion 48 to an inner edge 54, in the radial direction, of the outer reinforcing portion 48 along the outer reinforcing portion 48.

In the tire 2, a length Lu of the inner reinforcing portion 50 is preferably equal to or greater than 10 mm and preferably equal to or less than 50 mm. By the length Lu being set to 10 mm or greater, the inner reinforcing portion 50 effectively contributes to run-flat durability. In this respect, the length Lu is more preferably equal to or greater than 15 mm. By the length Lu being set to 50 mm or less, the influence of the inner reinforcing portion 50 on stiffness is suppressed. With the tire 2, favorable ride comfort is maintained. In this respect, the length Lu is more preferably equal to or less than 45 mm. In the cross-section of the tire 2 shown in FIG. 1 or 2, the length Lu is obtained by measuring the length from an outer edge 56, in the radial direction, of the inner reinforcing portion 50 to an inner edge 58, in the radial direction, of the inner reinforcing portion 50 along the inner reinforcing portion 50.

In the tire 2, the outer edge 52 of the outer reinforcing portion 48 is preferably covered with the main body 46. In other words, the outer edge 52 of the outer reinforcing portion 48 is preferably located inward of the outer edge PA of the apex 34 in the radial direction. Thus, concentration of distortion on the outer edge 52 of the outer reinforcing portion 48 is suppressed. The suppression of the concentration of distortion contributes to improvement in durability. In this respect, the length in the radial direction from the outer edge PA of the apex 34 to the outer edge 52 of the outer reinforcing portion 48 is preferably equal to or greater than 3 mm and more preferably equal to or greater than 5 mm. In light of contribution of the outer reinforcing portion 48 to stiffness, this length in the radial direction is preferably equal to or less than 15 mm and more preferably equal to or less than 10 mm.

In the tire 2, the outer edge 56 of the inner reinforcing portion 50 is preferably covered with the main body 46. In other words, the outer edge 56 of the inner reinforcing portion 50 is preferably located inward of the outer edge PA of the apex 34 in the radial direction. Thus, concentration of distortion on the outer edge 56 of the inner reinforcing portion 50 is suppressed. The suppression of the concentration of distortion contributes to improvement in durability. In this respect, the length in the radial direction from the outer edge PA of the apex 34 to the outer edge 56 of the inner reinforcing portion 50 is preferably equal to or greater than 3 mm and more preferably equal to or greater than 5 mm. In light of contribution of the inner reinforcing portion 50 to stiffness, this length in the radial direction is preferably equal to or less than 15 mm and more preferably equal to or less than 10 mm.

In production of the tire 2, a plurality of rubber components are assembled to obtain a raw cover (unvulcanized tire 2). The raw cover is put into a mold. The outer surface of the raw cover comes into contact with the cavity surface of the mold. The inner surface of the raw cover comes into contact with a bladder or a core. The raw cover is pressurized and heated in the mold. A rubber composition of the raw cover flows due to the pressurization and the heating. Cross-linking reaction is caused in the rubber due to the heating, to obtain the tire 2.

In production of the tire 2, the outer reinforcing portion 48 is obtained by attaching a sheet formed from a rubber composition for the outer reinforcing portion 48, to the main body 46. In this case, the thickness ts and the length Ls of the outer reinforcing portion 48 are taken into consideration for the thickness and the width of the sheet for the outer reinforcing portion 48. In production of the tire 2, the outer reinforcing portion 48 may be formed by helically winding a strip formed from a rubber composition. In this case, the thickness of the strip is adjusted within a range of 0.2 to 3.0 mm, and the width of the strip is adjusted within a range of 5 to 30 mm.

In production of the tire 2, the inner reinforcing portion 50 is obtained by attaching a sheet formed from a rubber composition for the inner reinforcing portion 50, to the main body 46. In this case, the thickness to and the length Lu of the inner reinforcing portion 50 are taken into consideration for the thickness and the width of the sheet for the inner reinforcing portion 50. In production of the tire 2, the inner reinforcing portion 50 may be formed by helically winding a strip formed from a rubber composition. In this case, the thickness of the strip is adjusted within a range of 0.2 to 3.0 mm, and the width of the strip is adjusted within a range of 5 to 30 mm.

Figure 3:
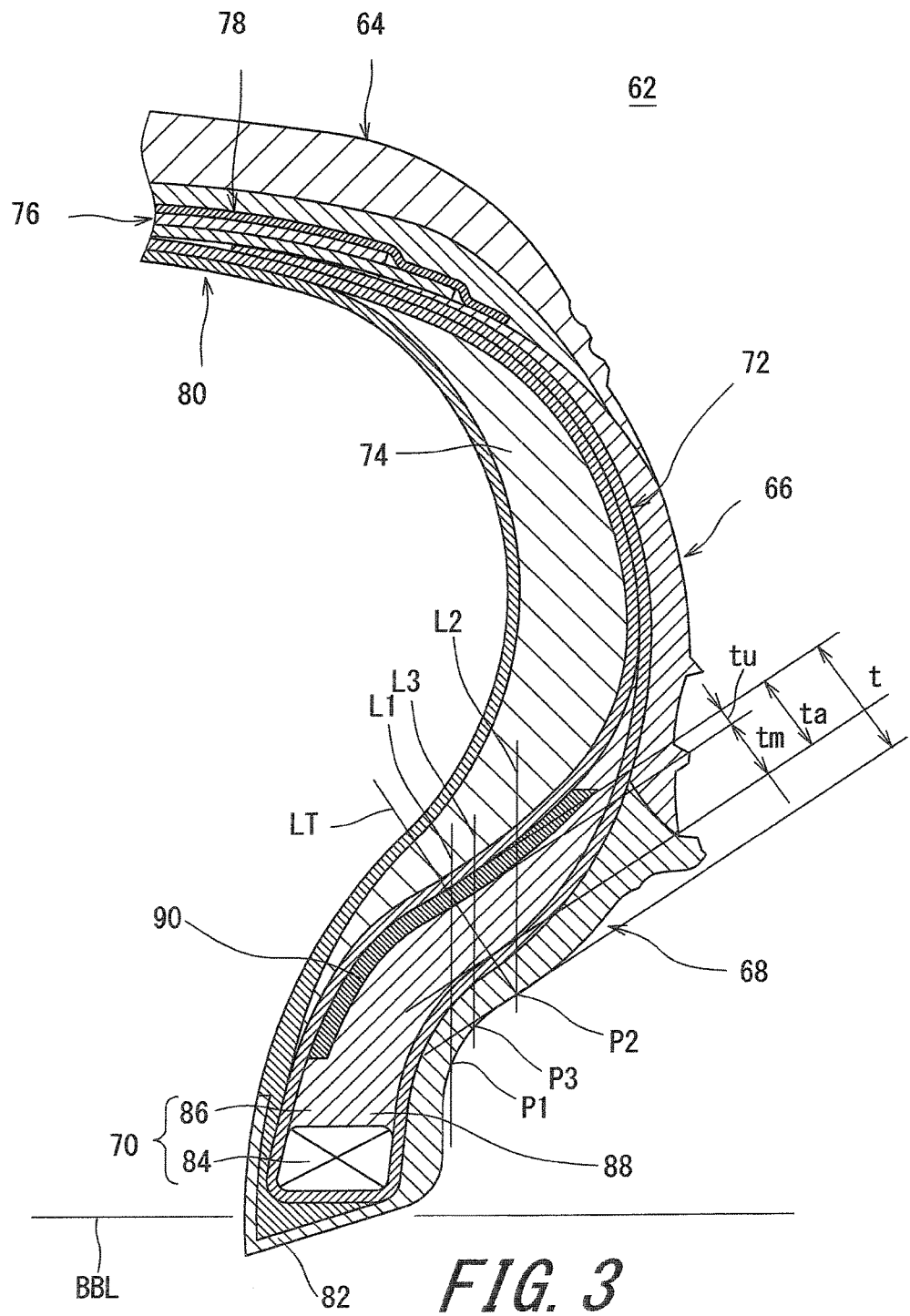
FIG. 3 is an enlarged cross-sectional view of a portion of a pneumatic tire according to another embodiment of the present invention.

FIG. 3 shows a pneumatic tire 62 according to another embodiment of the present invention. In FIG. 3, the up-down direction is the radial direction of the tire 62, the right-left direction is the axial direction of the tire 62, and the direction perpendicular to the surface of the sheet is the circumferential direction of the tire 62.

The tire 62 includes a tread 64, a pair of sidewalls 66, a pair of clinches 68, a pair of beads 70, a carcass 72, a pair of load support layers 74, a belt 76, a band 78, an inner liner 80, and a pair of chafers 82. Each bead 70 includes a core 84 and an apex 86. The tire 62 has the same configuration as that of the tire 2 shown in FIG. 1, except for the apex 86.

As described above, the apex 34 of the tire 2 shown in FIG. 1 is composed of the main body 46, the outer reinforcing portion 48, and the inner reinforcing portion 50. Meanwhile, in the tire 62, the apex 86 is composed of a main body 88 and an inner reinforcing portion 90.

The main body 88 and the inner reinforcing portion 90 of the apex 86 of the tire 62 have the same configurations as those of the main body 46 and the inner reinforcing portion 50 of the apex 34 of the tire 2 shown in FIG. 1, except for a later-described preferable range for a thickness tu of the inner reinforcing portion 90 and a later-described preferable range for the ratio of the thickness tu relative to a thickness to of the apex 86.

In the tire 62, the inner reinforcing portion 90 is located inward of the main body 88 in the axial direction and extends along the main body 88. In the tire 62, the inner reinforcing portion 90 contributes to ensuring a desired thickness of the apex 86.

In the tire 62, similarly to the inner reinforcing portion 50 of the tire 2 shown in FIG. 1, a loss tangent Tu of the inner reinforcing portion 90 is equal to a loss tangent Tm of the main body 88 or less than the loss tangent Tm, and is equal to a loss tangent Ti of the load support layer 74 or less than the loss tangent Ti. A hardness Hu of the inner reinforcing portion 90 is equal to a hardness Hm of the main body 88 or greater than the hardness Hm, and is equal to a hardness Hi of the load support layer 74 or greater than the hardness Hi. That is, the hardness Hu and the loss tangent Tu of the inner reinforcing portion 90 are adjusted in a well-balanced manner with respect to those of the main body 88 and the load support layer 74.

Moreover, in the tire 62, the inner reinforcing portion 90 is disposed so as to cover a portion where the tire 62 and the rim R are in contact with each other in a state where the tire 62 is fitted on the rim R.

In the tire 62, deformation of a bead 70 portion is effectively suppressed, and heat generation in this portion is also effectively suppressed. In the tire 62, damage of the bead 70 portion is prevented. With the tire 62, a sufficient running distance is ensured even in a state where the internal pressure thereof is decreased due to puncture.

According to the present invention, the pneumatic tire 62 is obtained which achieves improvement in durability in a state where the internal pressure thereof is decreased due to puncture.

In the tire 62, in light of run-flat durability, the thickness tu of the inner reinforcing portion 90 is preferably equal to or greater than 1.5 mm. In light of ride comfort during normal running, the thickness tu is preferably equal to or less than 11.5 mm. Moreover, in the tire 62, in light of run-flat durability, the ratio of the thickness tu relative to the thickness to of the apex 86 is preferably equal to or greater than 0.2. From the standpoint that favorable ride comfort is maintained, this ratio is preferably equal to or less than 0.8.

Figure 4:
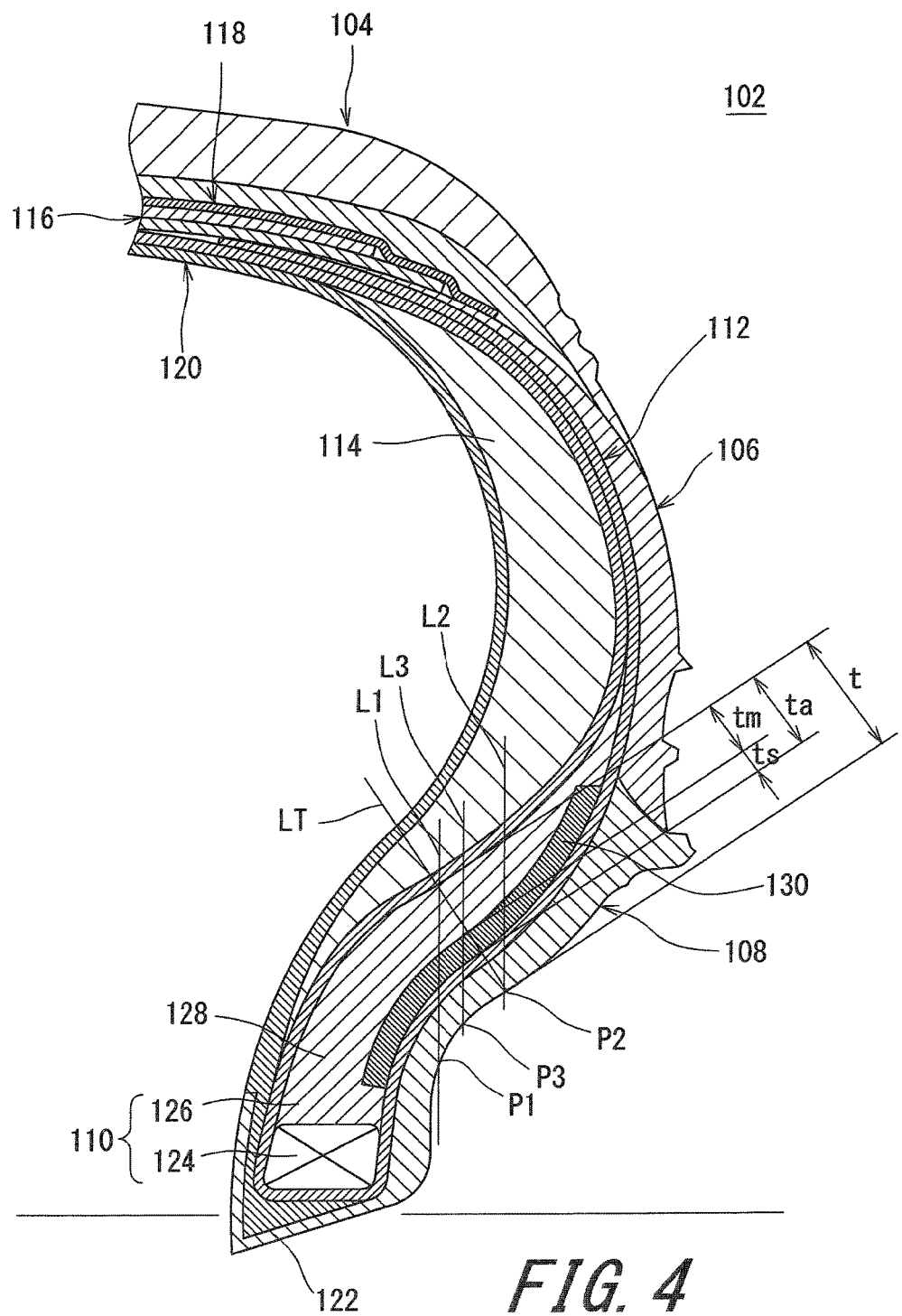
FIG. 4 is an enlarged cross-sectional view of a portion of a pneumatic tire according to still another embodiment of the present invention.

FIG. 4 shows a pneumatic tire 102 according to still another embodiment of the present invention. In FIG. 4, the up-down direction is the radial direction of the tire 102, the right-left direction is the axial direction of the tire 102, and the direction perpendicular to the surface of the sheet is the circumferential direction of the tire 102.

The tire 102 includes a tread 104, a pair of sidewalls 106, a pair of clinches 108, a pair of beads 110, a carcass 112, a pair of load support layers 114, a belt 116, a band 118, an inner liner 120, and a pair of chafers 122. Each bead 110 includes a core 124 and an apex 126. The tire 102 has the same configuration as that of the tire 2 shown in FIG. 1, except for the apex 126.

As described above, the apex 34 of the tire 2 shown in FIG. 1 is composed of the main body 46, the outer reinforcing portion 48, and the inner reinforcing portion 50. Meanwhile, in the tire 102, the apex 126 is composed of a main body 128 and an outer reinforcing portion 130.

The main body 128 and the outer reinforcing portion 130 of the apex 126 of the tire 102 have the same configurations as those of the main body 46 and the outer reinforcing portion 48 of the apex 34 of the tire 2 shown in FIG. 1, except for a later-described preferable range for a thickness ts of the outer reinforcing portion 130 and a later-described preferable range for the ratio of the thickness ts relative to a thickness to of the apex 126.

In the tire 102, the outer reinforcing portion 130 is located outward of the main body 128 in the axial direction and extends along the main body 128. In the tire 102, the outer reinforcing portion 130 contributes to ensuring a desired thickness of the apex 126.

In the tire 102, similarly to the outer reinforcing portion 48 of the tire 2 shown in FIG. 1, a loss tangent Ts of the outer reinforcing portion 130 is equal to a loss tangent Tm of the main body 128 or less than the loss tangent Tm, and is equal to a loss tangent Ti of the load support layer 114 or less than the loss tangent Ti. A hardness Hs of the outer reinforcing portion 130 is equal to a hardness Hm of the main body 128 or greater than the hardness Hm, and is equal to a hardness Hi of the load support layer 114 or greater than the hardness Hi. That is, the hardness Hs and the loss tangent Ts of the outer reinforcing portion 130 are adjusted in a well-balanced manner with respect to those of the main body 128 and the load support layer 114.

Moreover, in the tire 102, the outer reinforcing portion 130 is disposed so as to cover a portion where the tire 102 and the rim R are in contact with each other in a state where the tire 102 is fitted on the rim R.

In the tire 102, deformation of a bead 110 portion is effectively suppressed, and heat generation in this portion is also effectively suppressed. In the tire 102, damage of the bead 110 portion is prevented. With the tire 102, a sufficient running distance is ensured even in a state where the internal pressure thereof is decreased due to puncture.

According to the present invention, the pneumatic tire 102 is obtained which achieves improvement in durability in a state where the internal pressure thereof is decreased due to puncture.

In the tire 102, in light of run-flat durability, the thickness ts of the outer reinforcing portion 130 is preferably equal to or greater than 1.5 mm. In light of ride comfort during normal running, the thickness ts is preferably equal to or less than 11.5 mm. Moreover, in the tire 102, in light of run-flat durability, the ratio of the thickness ts relative to the thickness to of the apex 126 is preferably equal to or greater than 0.2. From the standpoint that favorable ride comfort is maintained, this ratio is preferably equal to or less than 0.8.

In the tire according to the present invention, the apex 34 shown in FIG. 2, the apex 86 shown in FIG. 3, or the apex 126 shown in FIG. 4 can be adopted as each apex of the tire. Meanwhile, in a punctured state, the degree of deformation of the bead portion is greater at the clinch side than at the support layer side, and the portion at the clinch side tends to generate heat more than the portion at the support layer side. Thus, from the standpoint that deformation is effectively suppressed to effectively suppress heat generation, the apex 34 in FIG. 2 and the apex 126 in FIG. 4 are preferable. From the standpoint that deformation is more effectively suppressed to more effectively suppress heat generation, the apex 34 in FIG. 2 is particularly preferable.

EXAMPLES

The following will show effects of the present invention by means of examples, but the present invention should not be construed in a limited manner based on the description of these examples.

Example 1

A tire shown in FIGS. 1 and 2 was produced. The size of the tire is 245/45RF19. In the tire, each apex is composed of a main body, an outer reinforcing portion, and an inner reinforcing portion. The thickness to of the apex, the length Ls and the thickness is of the outer reinforcing portion, and the length Lu and the thickness to of the inner reinforcing portion are as shown in Table 1 below.

Each of the outer reinforcing portion and the inner reinforcing portion was disposed so as to overlap the zone from the first point P1 to the second point P2 in the radial direction. This is represented as "Y" in the cells for first point (14 mm), third point (17 mm) and second point (20 mm) in the table.

The loss tangent Ts and the hardness Hs of the outer reinforcing portion and the loss tangent Tu and the hardness Hu of the inner reinforcing portion that were measured at 70° C. are as shown in Table 1 below. The loss tangent Ti of the load support layer measured at 70° C. was 0.06. The hardness Hi of the load support layer measured at 70° C. was 70. The loss tangent Tm of the main body measured at 70° C. was 0.06. The hardness Hm of the main body measured at 70° C. was 70.

Examples 2 and 3 and Comparative Examples 1 to 5

Tires of Examples 2 and 3 and Comparative Examples 1 to 5 were obtained in the same manner as in Example 1, except the loss tangent Ts and the hardness Hs of the outer reinforcing portion and the loss tangent Tu and the hardness Hu of the inner reinforcing portion were changed, and the difference (Ts−Tm) between the loss tangent Ts and the loss tangent Tm, the difference (Hs−Hm) between the hardness Hs and the hardness Hm, the difference (Ts−Ti) between the loss tangent Ts and the loss tangent Ti, the difference (Hs−Hi) between the hardness Hs and the hardness Hi, the difference (Tu−Tm) between the loss tangent Tu and the loss tangent Tm, the difference (Hu−Hm) between the hardness Hu and the hardness Hm, the difference (Tu−Ti) between the loss tangent Tu and the loss tangent Ti, and the difference (Hu−Hi) between the hardness Hu and the hardness Hi were as shown in Table 1 below.

Comparative Example 6

Comparative Example 6 is a conventional tire. No reinforcing portion is provided in each apex of Comparative Example 6. The apex is formed from a material that is the same as the material forming the main body of Example 1.

Example 4

A tire of Example 4 was obtained in the same manner as in Example 1, except each apex was composed of a main body and an inner reinforcing portion as shown in FIG. 3.

Examples 5 to 7 and Comparative Example 7

Tires of Examples 5 to 7 and Comparative Example 7 were obtained in the same manner as in Example 4, except the length Lu of the inner reinforcing portion was as shown in Table 2 below. In Comparative Example 7, the inner reinforcing portion was disposed so as to overlap the third point in the radial direction and not to overlap the first point and the second point in the radial direction. The inner reinforcing portion not overlapping the first point and the second point is represented as "N" in the cells for first point (14 mm) and the cells for second point (20 mm) in Table 2.

Example 8

A tire of Example 8 was obtained in the same manner as in Example 1, except each apex was composed of a main body and an outer reinforcing portion as shown in FIG. 4.

Examples 9 to 14

Tires of Examples 9 to 14 were obtained in the same manner as in Example 8, except the thickness to of the apex and the thickness is of the outer reinforcing portion were as shown in Table 3 below.

[Durability (Run-Flat)]

Each tire was mounted onto a normal rim and inflated with air to an internal pressure of 180 kPa. The tire was mounted to a drum type tire testing machine, and a vertical load of 7.5 kN was applied to the tire. A punctured state was reproduced with the internal pressure of the tire being set to normal pressure, and running with the tire was performed on a drum having a radius of 1.7 m at a speed of 80 km/h. A running distance until the tire became broken was measured. The results are shown as indexes based on the following categorization in Tables 1 to 3 below. A higher value indicates a better result.

1=Running distance was less than 160 km.
2=Running distance was equal to or greater than 160 km and less than 200 km.
3=Running distance was equal to or greater than 200 km and less than 220 km.
4=Running distance was equal to or greater than 220 km.

TABLE 1

| | | | | Results of Evaluation | | | | |
|---|---|---|---|---|---|---|---|---|
| | Ex. 2 | Comp. Ex. 1 | Comp. Ex. 2 | Comp. Ex. 3 | Ex. 3 | Comp. Ex. 4 | Ex. 1 | Comp. Ex. 5 |
| Configuration | FIG. 2 | FIG. 2 | FIG. 2 | FIG. 2 | FIG. 2 | FIG. 2 | FIG. 2 | FIG. 2 |
| | | | Apex | | | | | |
| Thickness ta [mm] | 7 | 7 | 7 | 7 | 7 | 7 | 7 | 7 |
| | | | Outer reinforcing portion | | | | | |

TABLE 1-continued

Results of Evaluation

| | Ex. 2 | Comp. Ex. 1 | Comp. Ex. 2 | Comp. Ex. 3 | Ex. 3 | Comp. Ex. 4 | Ex. 1 | Comp. Ex. 5 |
|---|---|---|---|---|---|---|---|---|
| Length Ls [mm] | 30 | 30 | 30 | 30 | 30 | 30 | 30 | 30 |
| Thickness ts [mm] | 1.5 | 1.5 | 1.5 | 1.5 | 1.5 | 1.5 | 1.5 | 1.5 |
| Loss tangent Ts | 0.03 | 0.03 | 0.06 | 0.08 | 0.03 | 0.08 | 0.06 | 0.08 |
| Hardness Hs | 75 | 65 | 65 | 65 | 70 | 70 | 75 | 75 |
| Difference (Ts − Tm) | −0.03 | −0.03 | 0.00 | 0.02 | −0.03 | 0.02 | 0.00 | 0.02 |
| Difference (Hs − Hm) | 5 | −5 | −5 | −5 | 0 | 0 | 5 | 5 |
| Difference (Ts − Ti) | −0.03 | −0.03 | 0.00 | 0.02 | −0.03 | 0.02 | 0.00 | 0.02 |
| Difference (Hs − Hi) | 5 | −5 | −5 | −5 | 0 | 0 | 5 | 5 |
| First point (14 mm) | Y | Y | Y | Y | Y | Y | Y | Y |
| Third point (17 mm) | Y | Y | Y | Y | Y | Y | Y | Y |
| Second point (20 mm) | Y | Y | Y | Y | Y | Y | Y | Y |
| Inner reinforcing portion | | | | | | | | |
| Length Lu [mm] | 30 | 30 | 30 | 30 | 30 | 30 | 30 | 30 |
| Thickness tu [mm] | 2.0 | 2.0 | 2.0 | 2.0 | 2.0 | 2.0 | 2.0 | 2.0 |
| Loss tangent Tu | 0.03 | 0.03 | 0.06 | 0.08 | 0.03 | 0.08 | 0.06 | 0.08 |
| Hardness Hu | 75 | 65 | 65 | 65 | 70 | 70 | 75 | 75 |
| Difference (Tu − Tm) | −0.03 | −0.03 | 0.00 | 0.02 | −0.03 | 0.02 | 0.00 | 0.02 |
| Difference (Hu − Hm) | 5 | −5 | −5 | −5 | 0 | 0 | 5 | 5 |
| Difference (Tu − Ti) | −0.03 | −0.03 | 0.00 | 0.02 | −0.03 | 0.02 | 0.00 | 0.02 |
| Difference (Hu − Hi) | 5 | −5 | −5 | −5 | 0 | 0 | 5 | 5 |
| First point (14 mm) | Y | Y | Y | Y | Y | Y | Y | Y |
| Third point (17 mm) | Y | Y | Y | Y | Y | Y | Y | Y |
| Second point (20 mm) | Y | Y | Y | Y | Y | Y | Y | Y |
| Durability | 4 | 1 | 1 | 1 | 3 | 1 | 3 | 1 |

TABLE 2

Results of Evaluation

| | Comp. Ex. 6 | Comp. Ex. 7 | Ex. 5 | Ex. 4 | Ex. 6 | Ex. 7 |
|---|---|---|---|---|---|---|
| Configuration | — | FIG. 3 | FIG. 3 | FIG. 3 | FIG. 3 | FIG. 3 |
| Apex | | | | | | |
| Thickness ta [mm] | 7 | 7 | 7 | 7 | 7 | 7 |
| Inner reinforcing portion | | | | | | |
| Length Lu [mm] | — | 5 | 10 | 30 | 50 | 70 |
| Thickness tu [mm] | — | 2.0 | 2.0 | 2.0 | 2.0 | 2.0 |
| Loss tangent Tu | — | 0.06 | 0.06 | 0.06 | 0.06 | 0.06 |
| Hardness Hu | — | 75 | 75 | 75 | 75 | 75 |
| Difference (Tu − Tm) | — | 0.00 | 0.00 | 0.00 | 0.00 | 0.00 |
| Difference (Hu − Hm) | — | 5 | 5 | 5 | 5 | 5 |
| Difference (Tu − Ti) | — | 0.00 | 0.00 | 0.00 | 0.00 | 0.00 |
| Difference (Hu − Hi) | — | 5 | 5 | 5 | 5 | 5 |
| First point (14 mm) | — | N | Y | Y | Y | Y |
| Third point (17 mm) | — | Y | Y | Y | Y | Y |
| Second point (20 mm) | — | N | Y | Y | Y | Y |
| Durability | 2 | 1 | 3 | 3 | 3 | 1 |

TABLE 3

Results of Evaluation

| | Ex. 9 | Ex. 10 | Ex. 11 | Ex. 8 | Ex. 12 | Ex. 13 | Ex. 14 |
|---|---|---|---|---|---|---|---|
| Configuration | FIG. 4 | FIG. 4 | FIG. 4 | FIG. 4 | FIG. 4 | FIG. 4 | FIG. 4 |
| Apex | | | | | | | |
| Thickness ta [mm] | 4 | 5 | 7 | 7 | 7 | 7 | 7 |
| Outer reinforcing portion | | | | | | | |
| Length Ls [mm] | 30 | 30 | 30 | 30 | 30 | 30 | 30 |
| Thickness ts [mm] | 1.5 | 1.5 | 1.0 | 1.5 | 3.5 | 4.5 | 5.5 |
| Loss tangent Ts | 0.06 | 0.06 | 0.06 | 0.06 | 0.06 | 0.06 | 0.06 |
| Hardness Hs | 75 | 75 | 75 | 75 | 75 | 75 | 75 |
| Difference (Ts − Tm) | 0.00 | 0.00 | 0.00 | 0.00 | 0.00 | 0.00 | 0.00 |
| Difference (Hs − Hm) | 5 | 5 | 5 | 5 | 5 | 5 | 5 |
| Difference (Ts − Ti) | 0.00 | 0.00 | 0.00 | 0.00 | 0.00 | 0.00 | 0.00 |
| Difference (Hs − Hi) | 5 | 5 | 5 | 5 | 5 | 5 | 5 |
| First point (14 mm) | Y | Y | Y | Y | Y | Y | Y |
| Third point (17 mm) | Y | Y | Y | Y | Y | Y | Y |
| Second point (20 mm) | Y | Y | Y | Y | Y | Y | Y |
| Durability | 1 | 3 | 2 | 3 | 3 | 3 | 2 |

As shown in Tables 1 to 3, the evaluation is higher in the tires of the examples than in the tires of the comparative examples. From the results of evaluation, advantages of the present invention are clear.

The above-described technique regarding the apex is also applicable to various tires.

The above descriptions are merely illustrative examples, and various modifications can be made without departing from the principles of the present invention.

What is claimed is:

1. A pneumatic tire comprising a tread, a pair of sidewalls, a pair of clinches, a pair of beads, carcass, and a pair of load support layers, wherein
   each sidewall extends from an edge of the tread substantially inward in a radial direction,
   each clinch extends from an edge of the sidewall substantially inward in the radial direction,
   each bead is located inward of the clinch in an axial direction,
   each load support layer is located inward of the sidewall in the axial direction,
   the bead includes a core and an apex,
   the apex is located outward of the core in the radial direction
   the apex includes a main body, a first reinforcing portion, and a second reinforcing portion,
   the main body extends from the core substantially outward in the radial direction,
   the first reinforcing portion is located inward of the main body and the second reinforcing portion is located outward of the main body in the axial direction and each reinforcing portion extends long the main body,
   when a position on an outer surface of the tire at which position a height in the radial direction from a bead base line is 14 mm is defined as a first point P1, and a position on the outer surface of the tire at which position a height in the radial direction from the bead base line is 20 mm is defined as a second point P2,
   the main body and both reinforcing portions overlap each of the first point P1 and the second point P2 in the radial direction,
   wherein at said second point P2 the apex has a thickness ta, the first reinforcing portion has a thickness tu, and the second reinforcing portion has a thickness ts, such that the ratio of the sum (ts+tu) relative to the thickness ta is greater than or equal to 0.2 and less than or equal to 0.8,
   the carcass includes a ply,
   the ply is turned up around each core from inner side toward the outer side in the axial direction, due to this turned-up, a main portion and a pair of turned up portion are formed in the ply,
   both reinforcing portions are interposed between the main portion and the corresponding turn-up portion,
   a loss tangent of each reinforcing portion is equal to a loss tangent of the main body or less than the loss tangent of the main body, and is equal to a loss tangent of the load support layer or less than the loss tangent of the load support layer,
   a hardness of the reinforcing portion is equal to a hardness of the main body or greater than the hardness, and is equal to a hardness of the load support layer or greater than the hardness,
   when the loss tangent of one of the reinforcing portions is equal to the loss tangent of the main body, the hardness of said reinforcing portion is greater than the hardness of the main body, and
   when the hardness of one of the reinforcing portions is equal to the hardness of the main body, the loss tangent of said reinforcing portion is less than the loss tangent of the main body.

2. The pneumatic tire according to claim 1, wherein when a line that is normal to the outer surface of the tire at the second point P2 is defined as a reference normal line,
   a thickness of the apex measured along the reference normal line is equal to or greater than 5 mm.

3. The pneumatic tire according to claim 2, wherein a thickness of each reinforcing portion measured along the reference normal line is equal to or greater than 1.5 mm.

4. The pneumatic tire according to claim 1, wherein a length of each reinforcing portion is equal to or greater than 10 mm and equal to or less than 50 mm.

5. The pneumatic tire according to claim 1, wherein one of the reinforcing portions immediately contacts with the main body.

6. The pneumatic tire according to claim 1, wherein the outer edge of one of the reinforcing portions is covered with the main body.

7. The pneumatic tire according to claim 1, wherein both of the reinforcing portions extends with constant thickness.

8. The pneumatic tire according to claim 1, wherein both of the reinforcing portions are formed from crosslinked rubber.

9. The pneumatic tire according to claim 1, wherein the load support layer overlaps each of the first point P1 and the second point P2 in the radial direction.

10. The pneumatic tire according to claim 1, wherein the difference between the loss tangent of the each reinforcing portion and the loss tangent of the load support layer is equal to or less than −0.03.

11. The pneumatic tire according to claim 1, wherein the difference between the hardness of each reinforcing portion and the hardness of the load support layer is equal to or greater than 5.

* * * * *